US012732676B2

(12) United States Patent
Shishido et al.

(10) Patent No.: US 12,732,676 B2
(45) Date of Patent: Sep. 8, 2026

(54) VARIABLE FOCAL LENGTH LENS DEVICE

(71) Applicant: MITUTOYO CORPORATION, Kanagawa (JP)

(72) Inventors: Yuko Shishido, Kanagawa (JP); Koji Kubo, Tokyo (JP); Tatsuya Nagahama, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 15 days.

(21) Appl. No.: 18/790,356

(22) Filed: Jul. 31, 2024

(65) Prior Publication Data

US 2025/0047960 A1 Feb. 6, 2025

(30) Foreign Application Priority Data

Aug. 1, 2023 (JP) ................................ 2023-125640

(51) Int. Cl.
*H04N 23/45* (2023.01)
*G02B 3/14* (2006.01)

(52) U.S. Cl.
CPC ............... *H04N 23/45* (2023.01); *G02B 3/14* (2013.01)

(58) Field of Classification Search
CPC ................................. G02B 3/14; H04N 23/45
See application file for complete search history.

(56) References Cited

U.S. PATENT DOCUMENTS 10,503,044 B1 12/2019 Watanabe et al.
10,663,629 B2 5/2020 Nagahama et al.
10,816,755 B2 10/2020 Sakai et al.
10,845,580 B2 11/2020 Igasaki et al.
10,908,398 B2 2/2021 Igasaki et al.
10,986,263 B2 4/2021 Sakai et al.
11,193,757 B2 12/2021 Yoshida et al.
11,215,788 B2 1/2022 Sakai et al.
11,237,354 B2 2/2022 Nagahama et al.
11,307,330 B2 4/2022 Kubo et al.
11,474,285 B2 10/2022 Igasaki et al.
11,525,978 B2 12/2022 Kubo
11,543,642 B2 1/2023 Kurahashi
11,619,769 B2 4/2023 Nagahama et al.
(Continued)

FOREIGN PATENT DOCUMENTS

JP 2019-74722 A 5/2019

*Primary Examiner* — Amy R Hsu

(74) *Attorney, Agent, or Firm* — Greenblum & Bernstein, P.L.C.

(57) ABSTRACT

A variable focal length lens device includes: a variable focal length optical system configured to change a focal length; a beam splitter configured to cause passing light, which is reflected off an object and passes through the variable focal length optical system, to branch into branched beams; an image-forming lens configured to condense the branched beams respectively; an image sensor configured to capture an image of the object by receiving the branched beam condensed by the image-forming lens; and an image sensor configured to capture an image of the object by receiving the branched beam condensed by the image-forming lens. An imaging distance on a first optical axis from the image sensor to the image-forming lens and an imaging distance on a second optical axis from the image sensor to the image-forming lens are different from each other.

8 Claims, 7 Drawing Sheets

(56) References Cited

U.S. PATENT DOCUMENTS

| | | | | |
|---|---|---|---|---|
| 11,801,570 | B2 * | 10/2023 | Kubo | B23K 26/032 |
| 12,114,831 | B2 * | 10/2024 | Duckett, III | A61B 1/00009 |
| 2019/0265490 | A1 * | 8/2019 | Duckett, III | A61B 1/0019 |
| 2021/0267443 | A1 * | 9/2021 | Baumann | H04N 25/61 |
| 2024/0210601 | A1 | 6/2024 | Yoshida et al. | |

* cited by examiner 1
50
CONTROLLER
21
210
L1
D1
D2
20
16
A2
15
40
22
LENS CONTROLLER
14
17
L2
220
10
10A
13
A1
31
12
LIGHT SOURCE
32
18
30
11
Pf2
W
Pf1

Figure 3:
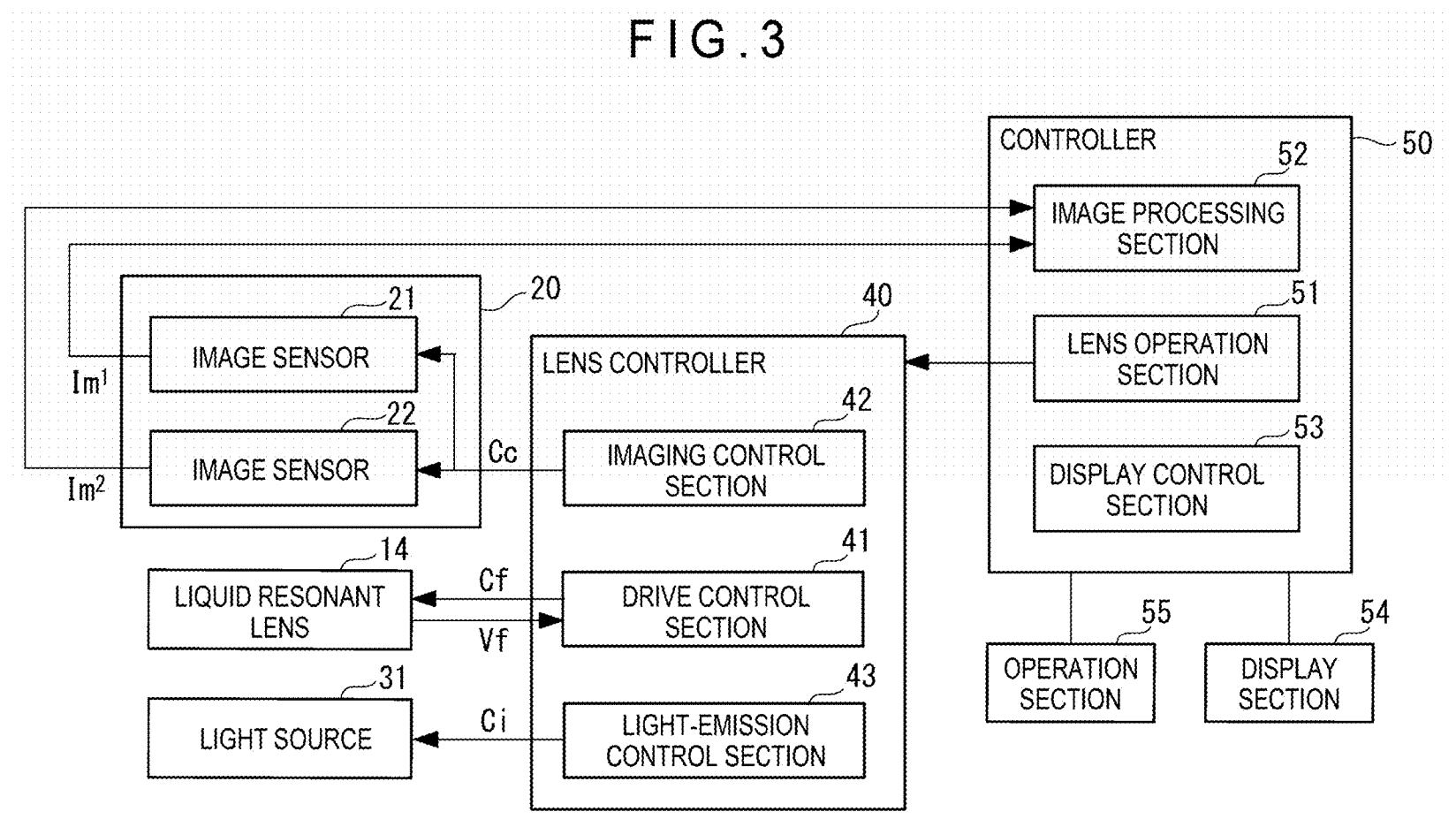

50
CONTROLLER
52 IMAGE PROCESSING SECTION
51 LENS OPERATION SECTION
53 DISPLAY CONTROL SECTION
54 DISPLAY SECTION
55 OPERATION SECTION
40
LENS CONTROLLER
42 IMAGING CONTROL SECTION
41 DRIVE CONTROL SECTION
43 LIGHT-EMISSION CONTROL SECTION
20
21 IMAGE SENSOR
22 IMAGE SENSOR
14 LIQUID RESONANT LENS
31 LIGHT SOURCE
Cc
Cf
Vf
Ci
$Im^1$
$Im^2$

FIG.7

VARIABLE FOCAL LENGTH LENS DEVICE

CROSS REFERENCE TO RELATED APPLICATIONS

The entire disclosure of Japanese Patent Application No. 2023-125640 filed Aug. 1, 2023 is expressly incorporated by reference herein.

TECHNICAL FIELD

The present invention relates to a variable focal length lens device.

BACKGROUND ART

In recent years, a liquid resonant lens that is a graded-index variable focal length lens has been developed, and a variable focal length lens device as a microscope system configured by combining this liquid resonant lens and an objective lens is known (e.g., see Literature 1: JP 2019-074722 A). In such a variable focal length lens device, a refractive index of the liquid resonant lens is periodically changed in accordance with a drive signal, which causes a focusing position to periodically vary. Therefore, focused images can be acquired in a wide range in an optical axis direction without using a mechanical lens driving means.

In the variable focal length lens device referred to above, the variable range of a focusing position (i.e., a scan range in the optical axis direction where a focused image is acquirable) is determined in accordance with the optical magnification of the objective lens, and the higher the optical magnification of the objective lens is, the smaller the scan range is. Therefore, in the case where the inspection requiring a high resolution and the like are performed, the inconvenience occurs that, as the magnification of an objective lens in use increases, the scan range decreases.

SUMMARY OF THE INVENTION

An object of the invention is to provide a variable focal length lens device in which a wide scan range can be secured.

A variable focal length lens device according to an aspect of the invention includes: a variable focal length optical system configured to change a focal length; a beam splitter configured to cause passing light to branch into a first branched beam and a second branched beam, the passing light being reflected off an object and passing through the variable focal length optical system; at least one image-forming lens configured to condense the passing light before being split by the beam splitter or condense each of the first branched beam and the second branched beam; a first image sensor configured to capture an image of the object by receiving the first branched beam condensed; and a second image sensor configured to capture an image of the object by receiving the second branched beam condensed, in which a first imaging distance and a second imaging distance are different from each other, the first imaging distance being a distance on a first optical axis from the first image sensor to the image-forming lens arranged just in front of the first image sensor, the second imaging distance being a distance on a second optical axis from the second image sensor to the image-forming lens arranged just in front of the second image sensor.

In such a configuration, a variable range of a focusing position (hereinafter referred to as a first focusing position) of an image formed at the first image sensor and a variable range of a focusing position (hereinafter referred to as a second focusing position) of an image formed at the second image sensor are located at positions different from each other on the first optical axis. Therefore, a range including the variable range of the first focusing position and the variable range of the second focusing position is wider than the single variable range of each of the first focusing position and the second focusing position. Thus, it is possible to secure a wider scan range where focused images are acquirable than a conventional scan range.

In the aspect of the invention, a gap on the first optical axis may be provided between a variable range of a first focusing position and a variable range of a second focusing position, the first focusing position being a focusing position of an image formed at the first image sensor, the second focusing position being a focusing position of an image formed at the second image sensor.

In the aspect of the invention, a variable range of a first focusing position and a variable range of a second focusing position are mutually continuous on the first optical axis, the first focusing position being a focusing position of an image formed at the first image sensor, the second focusing position being a focusing position of an image formed at the second image sensor.

In the aspect of the invention, the variable focal length lens device may further include a movement mechanism configured to move the second image sensor along an incident direction of the second branched beam.

In such a configuration, a difference between the first imaging distance and the second imaging distance can be easily changed.

In the aspect of the invention, it is preferable that the variable focal length optical system includes: an objective lens; an intermediate image-forming lens configured to form an intermediate image by condensing a beam from the objective lens; a relay lens configured to relay the intermediate image at infinity, in combination with the image-forming lens; and a variable focal length lens arranged between the relay lens and the at least one image-forming lens, a refractive index of the variable focal length lens being periodically changed in accordance with a drive signal input to the variable focal length lens, and a front principal point of the variable focal length lens has a conjugate relationship with an exit pupil of the objective lens.

In such a configuration, the magnifications of the images respectively incident on the first image sensor and the second image sensor are constant, even if the first focusing position and the second focusing position are changed. Accordingly, observation while changing the first focusing position and the second focusing position is facilitated.

In the aspect of the invention, the variable focal length optical system may further include an aperture diaphragm arranged in a position corresponding to a rear focal point of the objective lens and a front focal point of the intermediate image-forming lens.

In such a configuration, since a both-side telecentric optical system is configured including the variable focal length optical system, it is possible to make images respectively incident on the first image sensor and the second image sensor uniform in size.

The variable focal length lens device according to the aspect of the invention may further include an image processing section configured to make a first image and a second image uniform in size, the first image being output from the first image sensor, the second image being output from the second image sensor.

According to the invention, it is possible to provide a variable focal length lens device in which a wider scan range than a conventional scan range can be secured.

BRIEF DESCRIPTION OF DRAWINGS

FIG. 2 is a diagram schematically illustrating a change of focusing positions in the variable focal length lens device according to the exemplary embodiment.

FIG. 3 is a block diagram illustrating the variable focal length lens device according to the exemplary embodiment.

FIG. 7 is a schematic diagram illustrating a variable focal length lens device according to another modification of the exemplary embodiment.

DETAILED DESCRIPTION

An exemplary embodiment of the invention will be described below.

Figure 1:
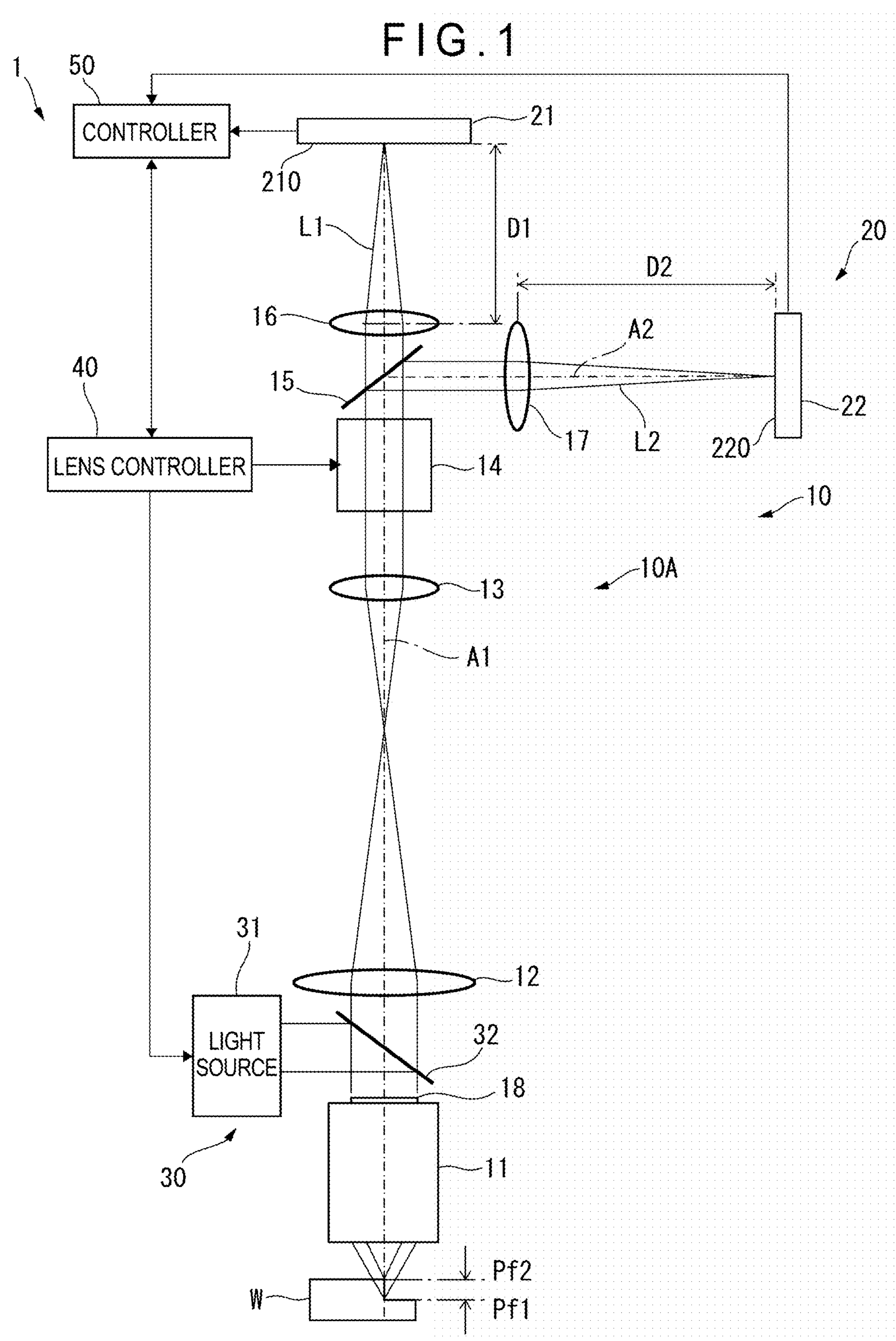
FIG. 1 is a schematic diagram illustrating a variable focal length lens device according to an exemplary embodiment of the invention.

FIG. 1 schematically illustrates a variable focal length lens device 1 according to the exemplary embodiment. The variable focal length lens device 1 acquires images Im1 and Im2 of an object W respectively corresponding two focusing positions Pf1 and Pf2, while periodically changing both of the focusing positions Pf1 and Pf2.

Configuration of Variable Focal Length Lens Device

As illustrated in FIG. 1, the variable focal length lens device 1 includes an imaging optical system 10, an imaging unit 20 that captures an image of an object W through the imaging optical system 10, an illuminator 30 that illuminates the object W, a lens controller 40 that controls the operation of a liquid resonant lens 14 included in the imaging optical system 10, and a controller 50 that performs the operation of the lens controller 40, image processing and the like.

The imaging optical system 10 includes a variable focal length optical system 10A that periodically changes a focal length, a beam splitter 15 that causes passing light that is reflected off the object W and passes through the variable focal length optical system 10A to branch into a branched beam L1 (first branched beam) and a branched beam L2 (second branched beam), an image-forming lens 16 that condenses the branched beam L1, and an image-forming lens 17 that condenses the branched beam L2.

The variable focal length optical system 10A includes an objective lens 11, an intermediate image-forming lens 12, a relay lens 13, and the liquid resonant lens 14. The objective lens 11, the intermediate image-forming lens 12, the relay lens 13, and the liquid resonant lens 14 are arranged on an optical axis A1 in this order from an object side (front side).

The objective lens 11 is an infinity correction lens arranged facing the object W, and emits a light exiting from the object W and incident on the objective lens 11, as a parallel beam. The intermediate image-forming lens 12 forms an intermediate image by condensing the parallel beam exiting from the objective lens 11 and incident on the intermediate image-forming lens 12.

Further, a rear focal position of the objective lens 11 and a front focal position of the intermediate image-forming lens 12 are in the same position on the optical axis, and an aperture diaphragm 18 is arranged in that same position. Of the light incident on the objective lens 11, rays whose principal ray is parallel to the optical axis pass through the aperture diaphragm 18, and the principal ray of the rays passing through the aperture diaphragm 18 exits from the intermediate image-forming lens 12, and then becomes parallel to the optical axis on an image side (both-side telecentric).

The relay lens 13 is an infinity correction lens arranged on an image side of the intermediate image-forming lens 12, and constitutes a relay optical system, in combination with each of the image-forming lenses 16 and 17. Such a relay optical system relays at infinity an intermediate image formed at the intermediate image-forming lens 12.

The liquid resonant lens 14 is arranged on an image side of the relay lens 13, i.e., between the relay lens 13 and the image-forming lenses 16 and 17, and has a front principal point in a conjugate relationship with an exit pupil of the objective lens 11. The liquid resonant lens 14 is configured as a graded-index variable focal length lens.

A known technology is applicable for the specific configuration of the liquid resonant lens 14. For example, the liquid resonant lens 14 includes a cylindrical case filled with a liquid, and a cylindrical oscillation member made from a piezoelectric material. The oscillation member in a state of being immersed in the liquid in the case is connected to the lens controller 40 through a signal line, and oscillates in accordance with a drive signal Cf (e.g., sinusoidal AC signal) input from the lens controller 40. When the frequency of the drive signal Cf is adjusted to a resonance frequency, a standing wave is generated in the liquid inside the liquid resonant lens 14, so that a refractive index of the liquid is periodically changed. The case of the liquid resonant lens 14 is provided with a window for light passing therethrough, and the refractive index of the liquid in the case is periodically changed, thereby periodically changing a refractive index of the liquid resonant lens 14. Accordingly, the focal length of the variable focal length optical system 10A is periodically changed, and as a result, the focusing positions Pf1 and Pf2 of images formed respectively on image sensors 21 and 22 of the imaging unit 20 are periodically changed (see FIG. 2).

In FIG. 1, the beam splitter 15 is an optical component that causes incident light to branch into two beams, and is arranged on an image side of the variable focal length optical system 10A, i.e., between the liquid resonant lens 14 and the image-forming lenses 16 and 17. The beam splitter 15 causes passing light that passes through the liquid resonant lens 14 to branch into the branched beam L1 to pass through the beam splitter 15 and the branched beam L2 to be reflected by the beam splitter 15. The branched beam L1 travels along the optical axis A1, and the branched beam L2 travels along an optical axis A2 orthogonal to the optical axis A1.

While relaying, in combination with the relay lens 13, intermediate images formed by the intermediate image-forming lens 12, the image-forming lenses 16 and 17 respectively re-form the intermediate images at the image sensors 21 and 22 of the imaging unit 20. Specifically, the image-forming lens 16 is arranged on the optical axis A1, and re-forms an intermediate image at the image sensor 21 by condensing the branched beam L1 branched by the beam splitter 15. The image-forming lens 17 is arranged on the optical axis A2, and re-forms an intermediate image at the image sensor 22 by condensing the branched beam L2 branched by the beam splitter 15.

It should be noted that, in the exemplary embodiment, each of the objective lens 11, the intermediate image-forming lens 12, the relay lens 13, and the image-forming lenses 16 and 17 may be configured by a lens group including multiple lenses in combination. Further, in the exemplary embodiment, the image-forming lenses 16 and 17 are mutually the same in structure and focal length.

The imaging unit 20 includes the image sensor 21 corresponding to a first image sensor of the invention, and the image sensor 22 corresponding to a second image sensor of the invention. Each of the image sensors 21 and 22 is an existing CCD (Charge Coupled Device) image sensor or the like.

The image sensor 21 includes an image capturing surface 210 arranged orthogonal to the optical axis A1. The image sensor 21 captures an image of the object W by receiving the branched beam L1, which is condensed by the image-forming lens 16, on the image capturing surface 210, and outputs the image Im1 in a predetermined signal form to the controller 50.

Similarly, the image sensor 22 includes an image capturing surface 220 arranged orthogonal to the optical axis A2. The image sensor 22 captures an image of the object W by receiving the branched beam L2, which is condensed by the image-forming lens 17, on the image capturing surface 220, and outputs the image Im2 in a predetermined signal form to the controller 50.

Here, an imaging distance D1 (first imaging distance) that is a distance on the optical axis A1 from the image sensor 21 to the image-forming lens 16 arranged just in front (e.g., from the image capturing surface 210 of the image sensor 21 to the principal point of the image-forming lens 16), and an imaging distance D2 (second imaging distance) that is a distance on the optical axis A2 from the image sensor 22 to the image-forming lens 17 arranged just in front (e.g., from the image capturing surface 220 of the image sensor 22 to the principal point of the image-forming lens 17) are distances different from each other.

Specifically, the imaging distance D1 is set to a distance X, and the imaging distance D2 is set to a distance $X+a\beta^2$. Here, the distance X is preferably of a value that is set such that the image sensor 21 is arranged in the focal depth of the imaging optical system 10. Similarly, the distance $X+a\beta^2$ is preferably of a value that is set such that the image sensor 22 is arranged in the focal depth of the imaging optical system 10.

For example, the distance X is a rear focal length of the image-forming lenses 16 and 17.

Figure 2:
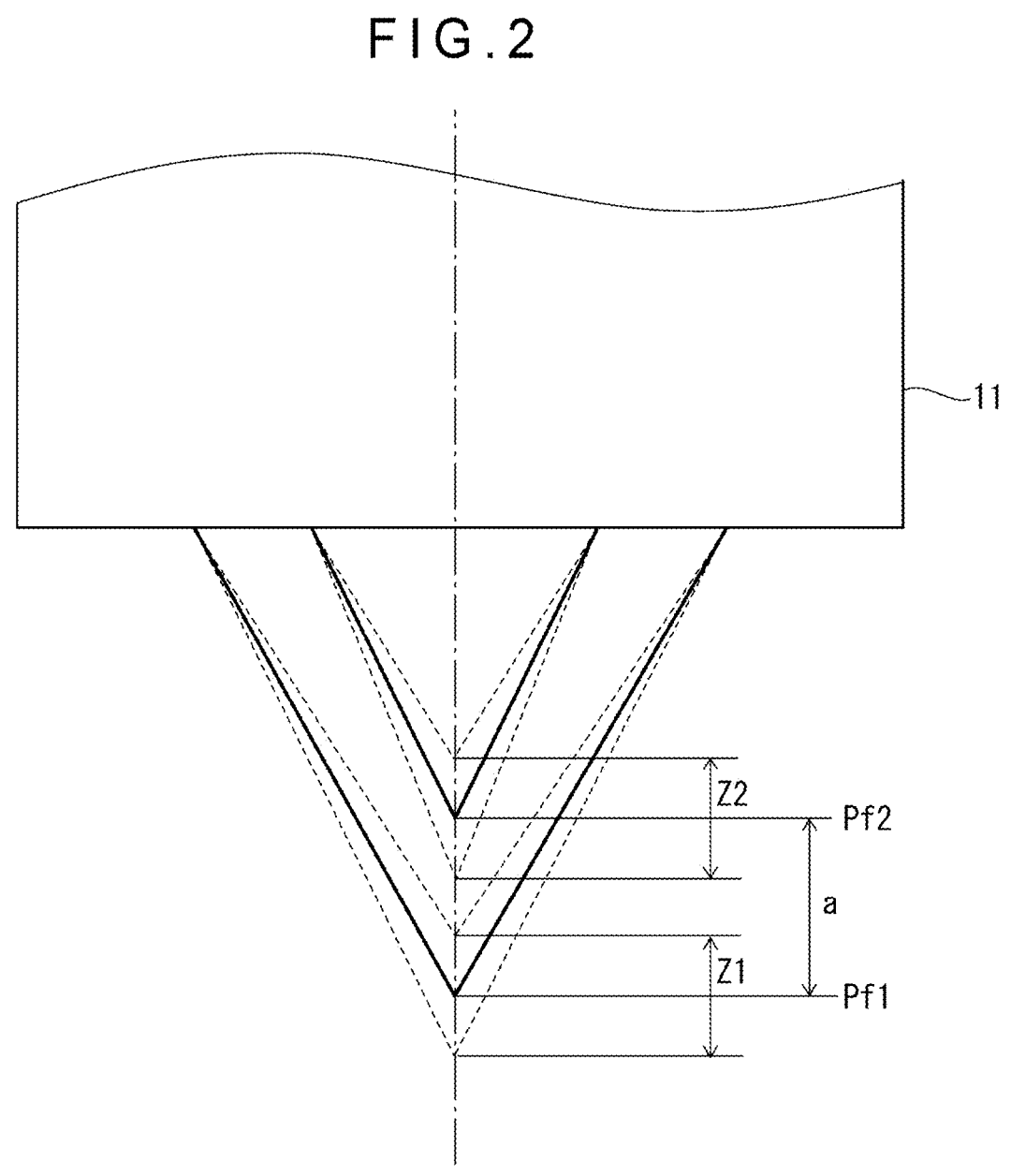

Further, a parameter a in the distance $X+a\beta^2$ corresponds to a difference between the focusing position Pf1 and the focusing position Pf2 at any point in time (see FIG. 2). The parameter a can be set to any value other than 0, and is preferably equal to or greater than (Z1+Z2)/2.

Further, a parameter β in the distance $X+a\beta^2$ corresponds to a lateral magnification of the imaging optical system 10. Especially, in the case where the relay optical system including the relay lens 13 and the image-forming lenses 16 and 17 is an equal-magnification relay system, the parameter β corresponds to a lateral magnification of the objective lens 11.

Since the imaging distance D1 and the imaging distance D2 are distances different from each other, a variable range Z1 of the focusing position Pf1 (first focusing position) of an image formed at the image sensor 21, and a variable range Z2 of the focusing position Pf2 (second focusing position) of an image formed at the image sensor 22 are ranges different from each other on the optical axis A1. It should be noted that, in the exemplary embodiment, the focal lengths of the image-forming lenses 16 and 17 are the same length, and therefore the sizes of the variable ranges Z1 and Z2 are equal to each other.

In FIG. 1, the illuminator 30 includes a light source 31 that emits light, and a beam splitter 32 for guiding the light emitted from the light source 31 to the object W.

The light source 31 is configured including a light-emitting element such as an LED or the like. The light source 31 is controlled by the lens controller 40, and may emit pulsed light at a timing in synchronization with any phase of the drive signal Cf or may emit continuous light.

The beam splitter 32 is arranged between the objective lens 11 and the intermediate image-forming lens 12, and reflects the light emitted from the light source 31 toward the objective lens 11. The light reflected by the beam splitter 32 is irradiated on the object W through the objective lens 11. Further, the beam splitter 32 transmits the light after being reflected off the object W and passing through the objective lens 11.

The lens controller 40 controls the respective operations of the liquid resonant lens 14, the imaging unit 20, and the illuminator 30. Specifically, as illustrated in FIG. 3, the lens controller 40 includes a drive control section 41 that outputs the drive signal Cf to the liquid resonant lens 14, an imaging control section 42 that outputs an imaging signal Cc to the imaging unit 20, and a light-emission control section 43 that outputs a light-emission signal Ci to the light source 31. It should be noted that the lens controller 40 may be configured in a form of hardware including multiple ICs and the like, or may be configured mainly including a computer provided with a CPU so that the lens controller 40 is realized by the CPU running a program stored in a storage.

The drive control section 41 detects an oscillation state Vf of the liquid resonant lens 14 and also outputs, as the drive signal Cf, a sinusoidal AC signal that is controlled on the basis of the detected oscillation state Vf. It should be noted that the oscillation state Vf of the liquid resonant lens 14 can be detected by using, solely or in combination, at least one of a drive voltage, a drive current, an effective power, which are supplied to the liquid resonant lens 14 by means of the drive signal Cf, or a voltage-current phase difference that is a phase difference between the drive voltage and the drive current.

The imaging control section 42 controls the timing of image detection of the imaging unit 20, by means of the imaging signal Cc. The respective image sensors 21 and 22 of the imaging unit 20 continue exposure only during a period from turning ON to turning OFF of the imaging signal Cc, thereby detecting the images Im1 and Im2 in one frame. For example, the ON state of the imaging signal Cc is continued during the multiple cycles of the drive signal Cf.

The light-emission control section 43 controls the light source 31 by means of the light-emission signal Ci. For example, in the case where the light-emission control section 43 outputs the light-emission signal Ci in a pulsed state at a timing when the drive signal Cf is in a predetermined phase, the light source 31 can emit pulsed light at a timing in synchronization with such a phase.

The controller 50 is a device configured including a general-purpose personal computer. The controller 50 includes an arithmetic circuit such as a CPU, a storage and the like, and functions as a lens operation section 51, an image processing section 52, and a display control section 53 by the arithmetic circuit reading and executing a software recorded in the storage. Further, a display section 54 such as a display and an operation section 55 such as a keyboard are, as a user interface, connected to the controller 50.

The lens operation section 51 performs various types of setting for the lens controller 40.

The image processing section 52 imports the image Im1 (first image) and the image Im2 (second image) from the image sensors 21 and 22, and processes the images.

The display control section 53 causes the display section 54 to display the images Im1 and Im2 or the like processed by the image processing section 52. The display control section 53 may cause the display section 54 to simultaneously display the images Im1 and Im2, or switchably display the images Im1 and Im2 according to the user's operation or the like.

In the variable focal length lens device 1 described above, when an image of the object W is captured, the image Im1 focused at a desired height position in the variable range Z1 of the focusing position Pf1, and the image Im2 focused at a desired height position in the variable range Z2 of the focusing position Pf2 can be acquired.

For example, in the case where the light source 31 emits pulsed light at a timing in synchronization with a predetermined phase of the drive signal Cf, the images Im1 and Im2, which are focused at the focusing positions Pf1 and Pf2 corresponding to such a phase, can be simultaneously acquired. Further, in the case where the light source 31 emits continuous light, the images Im1 and Im2, as focal sweep images with the focusing positions Pf1 and Pf2 being continuously changed in the variable ranges Z1 and Z2, can be simultaneously acquired.

Effect

In the exemplary embodiment, the imaging distance D1 from the image sensor 21 to the image-forming lens 16 and the imaging distance D2 from the image sensor 22 to the image-forming lens 17 are different from each other, as described above. Accordingly, the variable range Z1 of the focusing position Pf1 of an image formed at the image sensor 21, and the variable range Z2 of the focusing position Pf2 of an image formed at the image sensor 22 are located at positions different from each other on the optical axis (see FIG. 2). A range including the variable range Z1 of the focusing position Pf1 and the variable range Z2 of the focusing position Pf2 is a range wider than one variable range Z1 (or one variable range Z2), and can be utilized as a scan range where focused images are acquirable. Thus, in the exemplary embodiment, it is possible to secure a wider scan range where focused images are acquirable than a conventional scan range. As a result, even when the objective lens 11 with a high magnification is used, it is possible to secure a wide scan range where focused images are acquirable.

Figure 4:
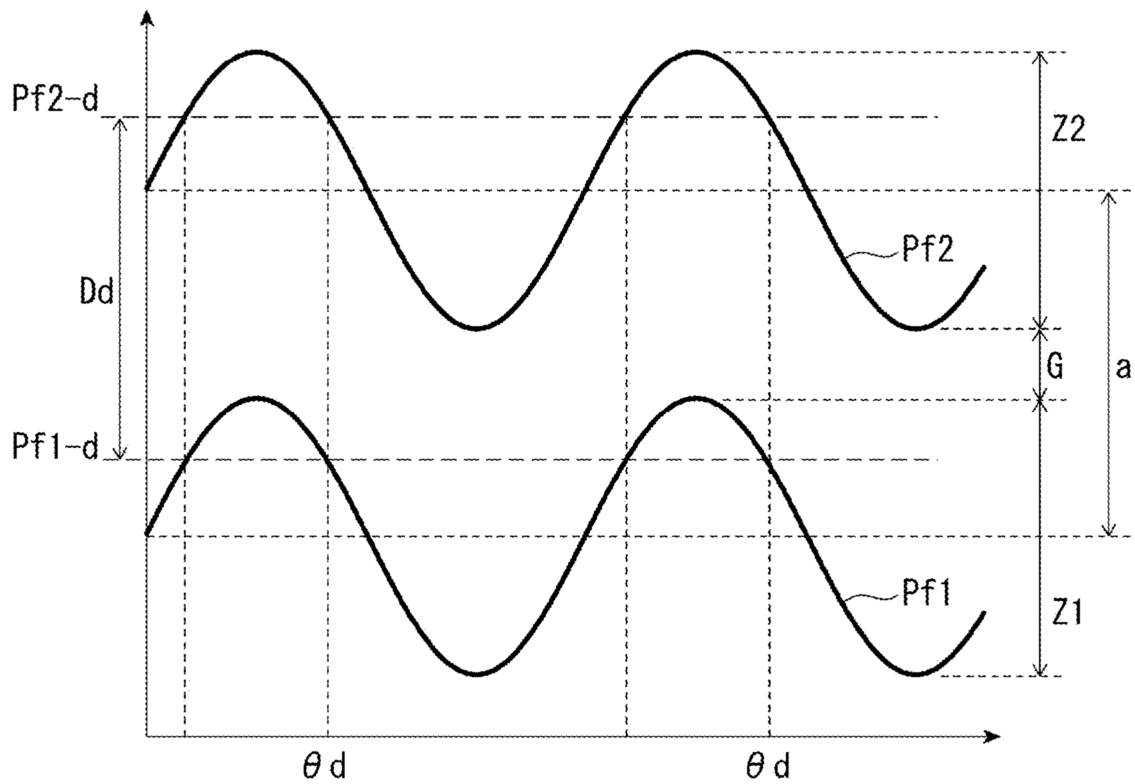
FIG. 4 is a graph illustrating variation waveforms of the focusing positions in the exemplary embodiment.
Figure 5:
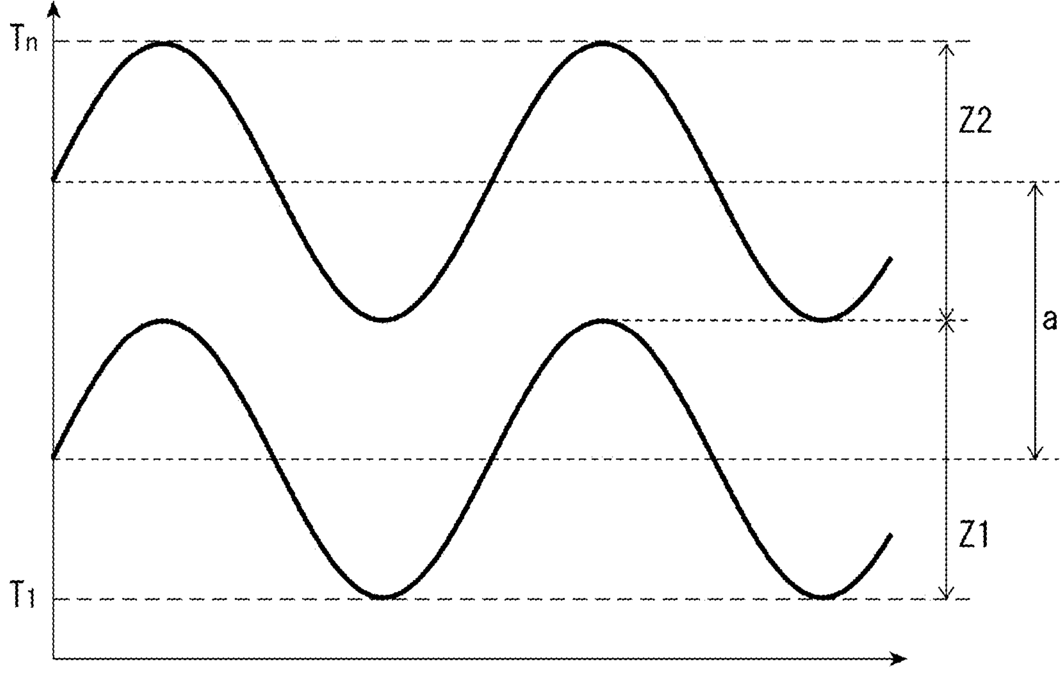
FIG. 5 is a graph illustrating variation waveforms of the focusing positions in the exemplary embodiment.

Exemplary variation waveforms of the focusing positions Pf1 and Pf2 are illustrated in FIGS. 4 and 5.

In the exemplary embodiment, the parameter a may be greater than (Z1+Z2)/2 as illustrated in FIG. 4, where a gap G on the optical axis may be provided between the variable range Z1 of the focusing position Pf1 and the variable range Z2 of the focusing position Pf2. For example, in the case where pulsed illumination is performed at a predetermined detection phase Od, the image Im1 focused at a focusing position Pf1-*d* corresponding to the detection phase Od and the image Im2 focused at a focusing position Pf2-*d* corresponding to the detection phase Od are each acquired. In such a case, the wider the gap G is, the greater a difference Dd between the focusing position Pf1-*d* and the focusing position Pf2-*d* is. For example, it is possible to simultaneously acquire the images Im1 and Im2 that are respectively focused at two positions more distant from each other than each size of the variable ranges Z1 and Z2 of the focusing positions Pf1 and Pf2.

Further, in the exemplary embodiment, the parameter a may be equal to (Z1+Z2)/2 as illustrated in FIG. 5, where the variable range Z1 of the focusing position Pf1 and the variable range Z2 of the focusing position Pf2 may be mutually continuous on the optical axis. In such a case, it is possible to acquire the images Im1 and Im2 focused at desired positions in a continuous range (Z1+Z2) including the variable range Z1 of the focusing position Pf1 and the variable range Z2 of the focusing position Pf2. For example, by repeating the image capturing, it is possible to acquire images (the images Im1 or the images Im2) focused at n-number of positions at a predetermined interval from a position T1 corresponding to a negative peak of the focusing position Pf1 to a position Tn corresponding to a positive peak of the focusing position pf2.

In the exemplary embodiment, the aperture diaphragm 18 is arranged in a position corresponding to a rear focal point of the objective lens 11 and a front focal point of the intermediate image-forming lens 12. The front principal point of the liquid resonant lens 14 is arranged to be conjugate with the exit pupil of the objective lens 11. Further, the respective front focal points of the lens 16 and the lens 17 are arranged to coincide with the rear principal point of the liquid resonant lens 14. Therefore, the imaging optical system 10 in the exemplary embodiment is configured as a both-side telecentric optical system.

With such a configuration, it is possible to make images respectively incident on the image sensor 21 and the image sensor 22 uniform in size. Thus, the images Im1 and Im2 can be easily compared with each other, without performing processing to adjust the sizes of the images Im1 and Im2. Further, with such a configuration, since the exit pupil of the objective lens 11 is relayed in a telecentric manner, the magnifications of the images respectively incident on the image sensors 21 and 22 are constant even if the focusing positions Pf1 and Pf2 are changed. Accordingly, observation while changing the focusing positions Pf1 and Pf2 is facilitated.

MODIFICATIONS

The invention is not limited to the above-described exemplary embodiment, and modifications thereof and the like are within the scope of the invention as long as the object of the invention is achievable.

Figure 6:
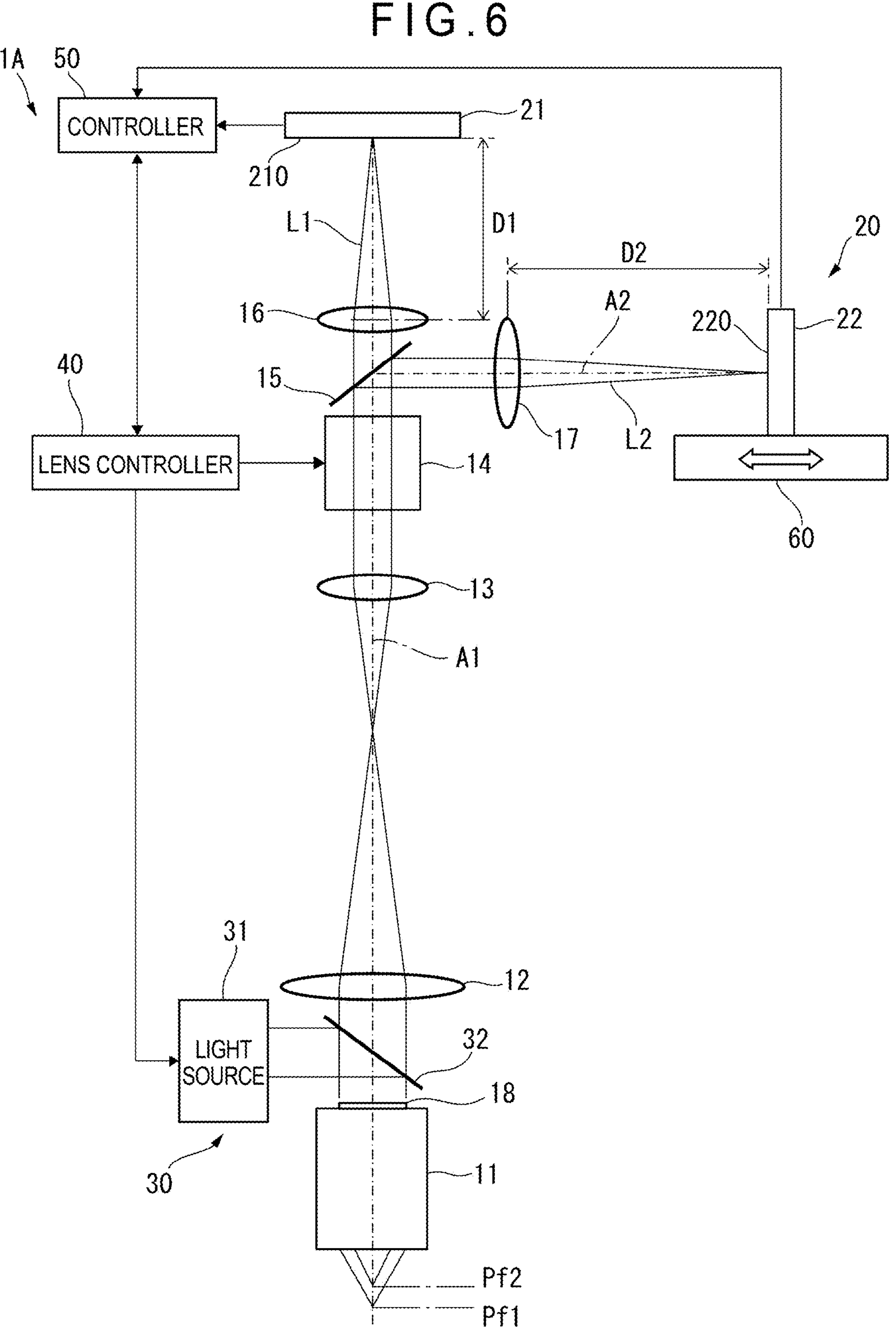
FIG. 6 is a schematic diagram illustrating a variable focal length lens device according to a modification of the exemplary embodiment.

As illustrated in FIG. 6, a variable focal length lens device 1A according to a modification may further include a movement mechanism 60 that moves the image sensor 22 along an incident direction of the branched beam L2 (i.e., the optical axis A2). The movement mechanism 60 may include any drive source, or may be manually operated by a user. The movement mechanism 60 moves the image sensor 22, thereby changing a difference between the imaging distance D1 and the imaging distance D2 (i.e., an $a\beta^2$ part of the distance $X+a\beta^2$). Accordingly, the difference a (see FIG. 2) between the focusing position Pf1 and the focusing position Pf2 at any point in time is changed. In such a configuration, it is possible to easily change a distance between the variable range Z1 of the focusing position Pf1 and the variable range Z2 of the focusing position Pf2, or an overlapping range in which the variable ranges Z1 and Z2 mutually overlap, or the like.

Figure 7:
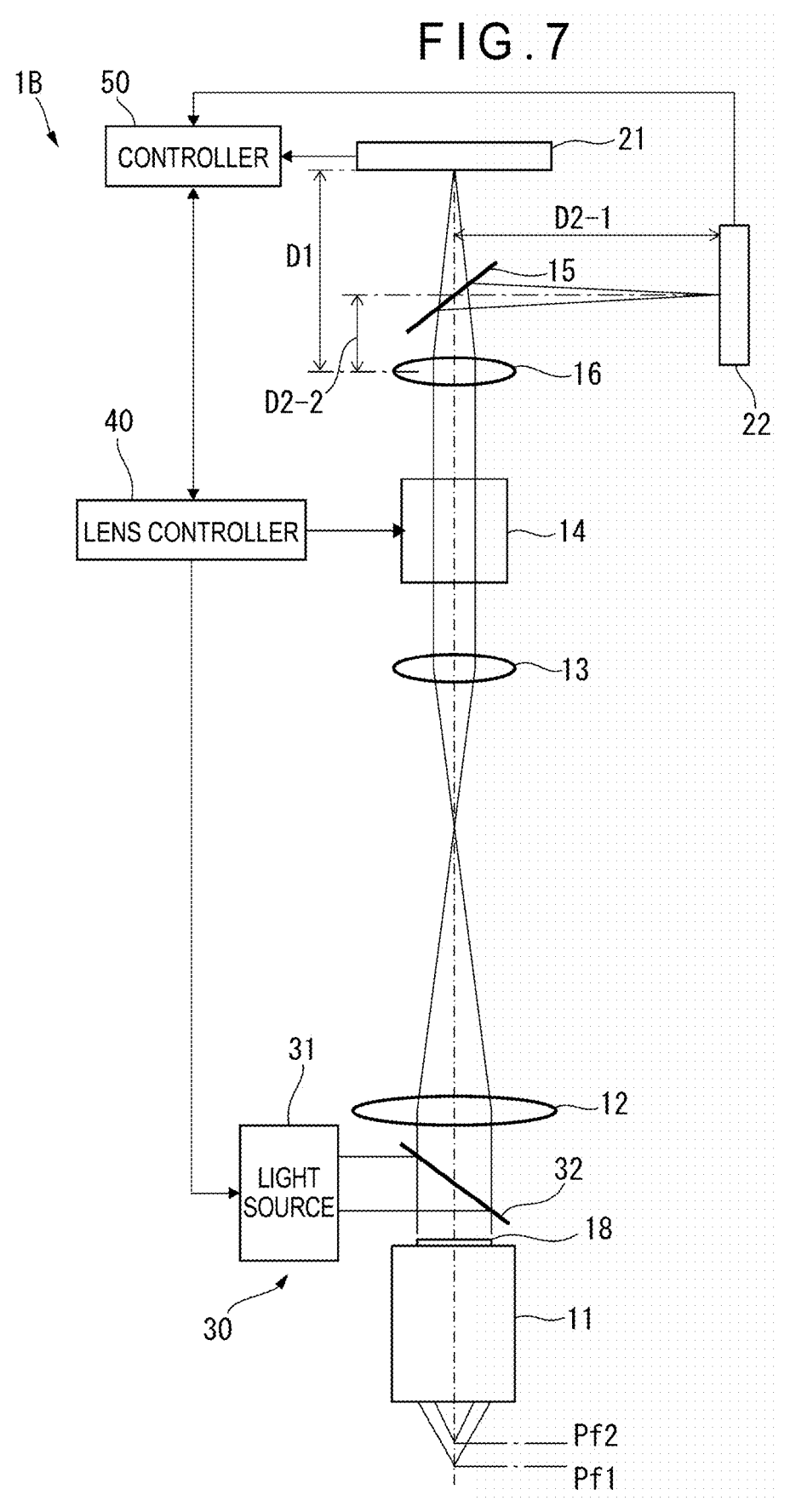

As illustrated in FIG. 7, in a variable focal length lens device 1B according to another modification, the beam splitter 15 may be arranged between the image-forming lens 16 and the image sensor 21. In this case, the variable focal length lens device 1B includes the image-forming lens 16, but does not include the image-forming lens 17. Further, the image-forming lens 16 condenses passing light after having passed through the liquid resonant lens 14 but before being split by the beam splitter 15. With such a configuration, it is possible to reduce the number of lenses in use while relaying an intermediate image to each of the image sensors 21 and 22. It should be noted that the imaging distance D2 is a distance along the optical axes A1 and A2 from the image sensor 22 to the image-forming lens 16 arranged just in front of the image sensor 22. Specifically, in FIG. 7, the imaging distance D2 is a total distance of a distance D2-1 from the image sensor 22 to the beam splitter 15 and a distance D2-2 from the beam splitter 15 to the image-forming lens 16.

In the exemplary embodiment described above, the imaging optical system is not limited to being both-side telecentric but may be object-side telecentric. In such a case, the image Im1 output from the image sensor 21 and the Image Im2 output from the image sensor 22 may be different in size. Further, in this case, the image processing section 52 may perform image processing to make the images Im1 and Im2 uniform in size. It should be noted that a reference size may be the size of one of the images Im1 and Im2, or another reference size may be employed.

In the exemplary embodiment described above, if size variation of the images Im1 and Im2 due to variation of the focusing positions Pf1 and Pf2 is not considered as a problem, the imaging optical system 10 needs not be both-side telecentric or object-side telecentric.

In the exemplary embodiment described above, the beam splitter 15 is a device that divides passing light passing through the liquid resonant lens 14 in a predetermined proportion. However, the beam splitter 15 may cause the passing light to branch time-wise into a first branched beam and a second branched beam by switching between reflection and transmission.

In the exemplary embodiment described above, while the image sensor 21 corresponds to a first image sensor of the invention, and the image sensor 22 corresponds to a second image sensor of the invention, the correspondence relationships may be interchanged. For example, the movement mechanism 60 described in the modification described above may move the image sensor 21 along an incident direction of the branched beam L1 (i.e., the optical axis A1).

While the variable focal length lens device 1 in the exemplary embodiment described above includes the two image sensors 21 and 22, the variable focal length lens device 1 may include three or more image sensors. For example, the variable focal length lens device 1 in the exemplary embodiment described above may further include a second beam splitter that causes any one of the branched beams to branch into a third branched beam, a third image-forming lens that condenses the third branched beam, and a third image sensor that captures an image formed by the third image-forming lens. In the case where an imaging distance from the third image sensor to the third image-forming lens is different from the imaging distances D1 and D2, it is possible to secure a further wider scan range where focused images are acquirable.

In the exemplary embodiment described above, the liquid resonant lens 14 in which the refractive index is changed in accordance with the drive signal Cf input to the liquid resonant lens 14 is described as the variable focal length lens of the invention. However, another type of variable focal length lens in which a focal length can be changed in a predetermined range by means of any method is usable.

What is claimed is:

1. A variable focal length lens device, comprising:

a variable focal length optical system configured to change a focal length;

a beam splitter configured to cause passing light to branch into a first branched beam and a second branched beam, the passing light being reflected off an object and passing through the variable focal length optical system;

at least one image-forming lens configured to condense the passing light before being split by the beam splitter or condense each of the first branched beam and the second branched beam;

a first image sensor configured to capture an image of the object by receiving the first branched beam condensed; and a second image sensor configured to capture an image of the object by receiving the second branched beam condensed, wherein a first imaging distance and a second imaging distance are different from each other, the first imaging distance being a distance on a first optical axis from the first image sensor to the image-forming lens arranged just in front of the first image sensor, the second imaging distance being a distance on a second optical axis from the second image sensor to the image-forming lens arranged just in front of the second image sensor, and wherein the beam splitter is provided between the variable focal length optical system and the first and second image sensors.

2. The variable focal length lens device according to claim 1, wherein a gap on the first optical axis is provided between a variable range of a first focusing position and a variable range of a second focusing position, the first focusing position being a focusing position of an image formed at the first image sensor, the second focusing position being a focusing position of an image formed at the second image sensor.

3. The variable focal length lens device according to claim 1, wherein a variable range of a first focusing position and a variable range of a second focusing position are mutually continuous on the first optical axis, the first focusing position being a focusing position of an image formed at the first image sensor, the second focusing position being a focusing position of an image formed at the second image sensor.

4. The variable focal length lens device according to claim 1, further comprising: a movement mechanism configured to move the second image sensor along an incident direction of the second branched beam.

5. The variable focal length lens device according to claim 1, wherein the variable focal length optical system comprises:

an objective lens;

an intermediate image-forming lens configured to form an intermediate image by condensing a beam from the objective lens;

a relay lens configured to relay the intermediate image at infinity, in combination with the image-forming lens; and a variable focal length lens arranged between the relay lens and the at least one image-forming lens, a refractive index of the variable focal length lens being periodically changed in accordance with a drive signal input to the variable focal length lens, and a front principal point of the variable focal length lens has a conjugate relationship with an exit pupil of the objective lens.

6. The variable focal length lens device according to claim 5, wherein the variable focal length optical system further comprises an aperture diaphragm arranged in a position corresponding to a rear focal point of the objective lens and a front focal point of the intermediate image-forming lens.

7. The variable focal length lens device according to claim 5, further comprising: an image processing section configured to make a first image and a second image uniform in size, the first image being output from the first image sensor, the second image being output from the second image sensor.

8. The variable focal length lens device according to claim 1, wherein a range for the variable focal length lens device includes a variable range of a first focusing position and a variable range of a second focusing position utilized as a scan range that is wider than each of the variable range of the first focusing position and the variable range of the second focusing position, the first focusing position being a focusing position of an image formed at the first image sensor, and the second focusing position being a focusing position of an image formed at the second image sensor.

* * * * *